July 8, 1969 R. E. HARRINGTON ET AL 3,453,815

TOBACCO HARVESTER

Filed Jan. 27, 1966

INVENTORS
ROY E. HARRINGTON
GEORGE H. SHRIVER
BY
ATTORNEY

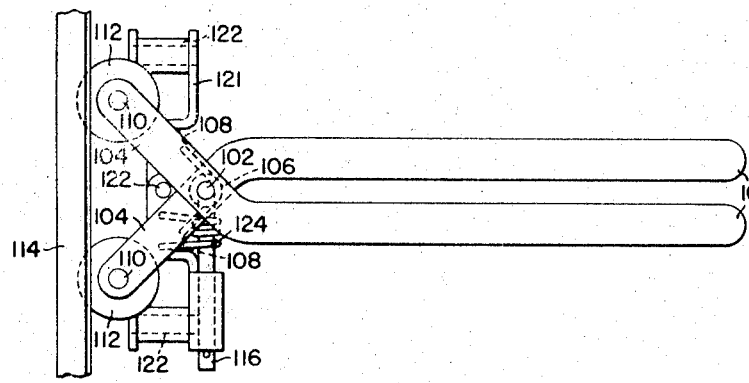
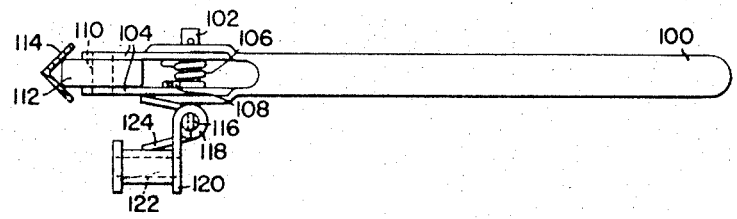
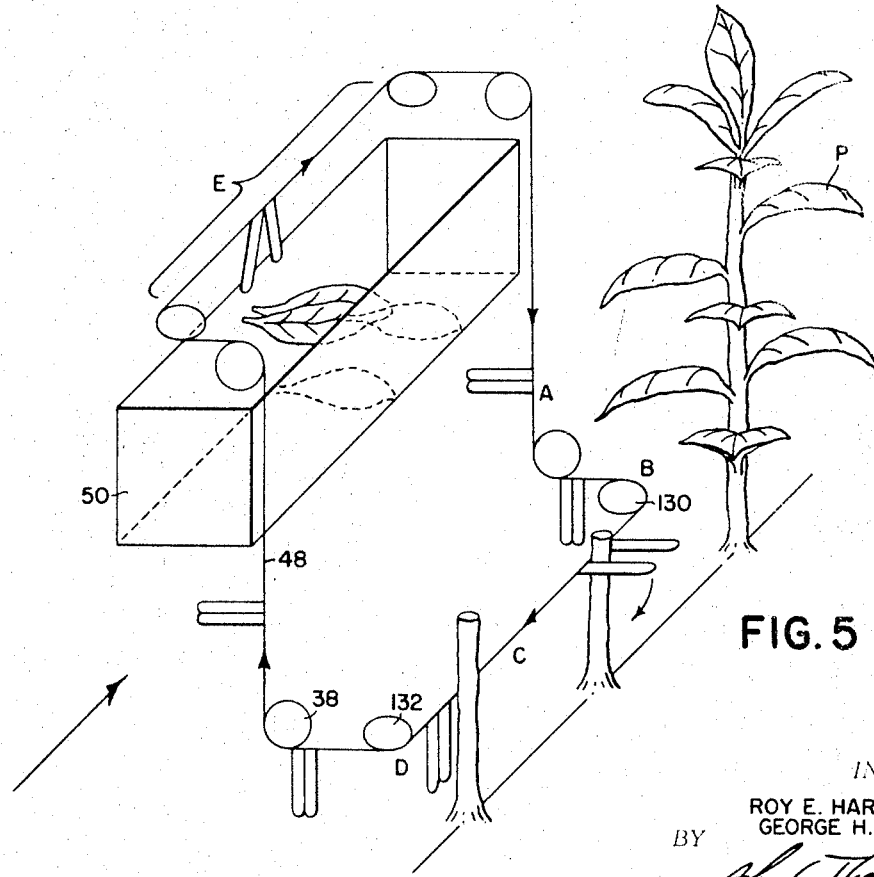

INVENTORS
ROY E. HARRINGTON
GEORGE H. SHRIVER
BY
ATTORNEY

United States Patent Office 3,453,815
Patented July 8, 1969

3,453,815
TOBACCO HARVESTER
Roy Edwards Harrington and George Harvey Shriver, Moline, Ill., assignors to Deere & Company, Moline, Ill., a corporation of Delaware
Filed Jan. 27, 1966, Ser. No. 523,303
Int. Cl. A01d *45/16*
U.S. Cl. 56—27.5
2 Claims

ABSTRACT OF THE DISCLOSURE

A tobacco harvester that includes a continuous chain having a fore-and-aft extending run adjacent a tobacco plant passage with fingers carried on the chain that open and close and move in the passage first vertically to orient the tobacco leaves, and then close upon the leaves for dislodging them from the plants.

---

The present invention relates generally to agricultural implements and more particularly to tobacco harvesting implements.

Although prior art tobacco harvesters have been proposed which are designed for priming flue-cured tobacco, these devices have not been entirely successful, one of the principal reasons being that after the leaves have been removed from the tobacco plant, they have been thrown into a hopper in a somewhat helter-skelter fashion. It has been a time-consuming task to remove the leaves from the hopper for placing them in hands at the barn so that they can in turn be placed upon sticks for curing, and therefore much of labor saved in priming has had to be utilized for forming hands at the barn.

Therefore, it is an object of this invention to provide a tobacco harvester which primes the leaves from a plant and places oriented leaves in a hopper. More specifically it is an object of this invention to provide a tobacco priming device which orients tobacco leaves, primes the leaves, and then conveys the primed leaves to a hopper in an oriented manner, the leaves finally being placed within the hopper still in their oriented fashion.

These and other objects and advantages of this invention will be apparent to those skilled in the art after a consideration of the following detailed description, taken in conjunction with the accompanying drawings in which the preferred form of this invention is illustrated.

FIG. 3 is a view of the leaf-engaging fingers.

FIG. 4 is a side view of the leaf-engaging fingers shown in FIG. 3.

FIG. 5 is a schematic perspective view showing the manner in which the defoliating fingers are positioned in various stations.

In the following description right-hand and left-hand reference is determined by standing to the rear of the tobacco harvester and facing the direction of travel.

Figure 1:
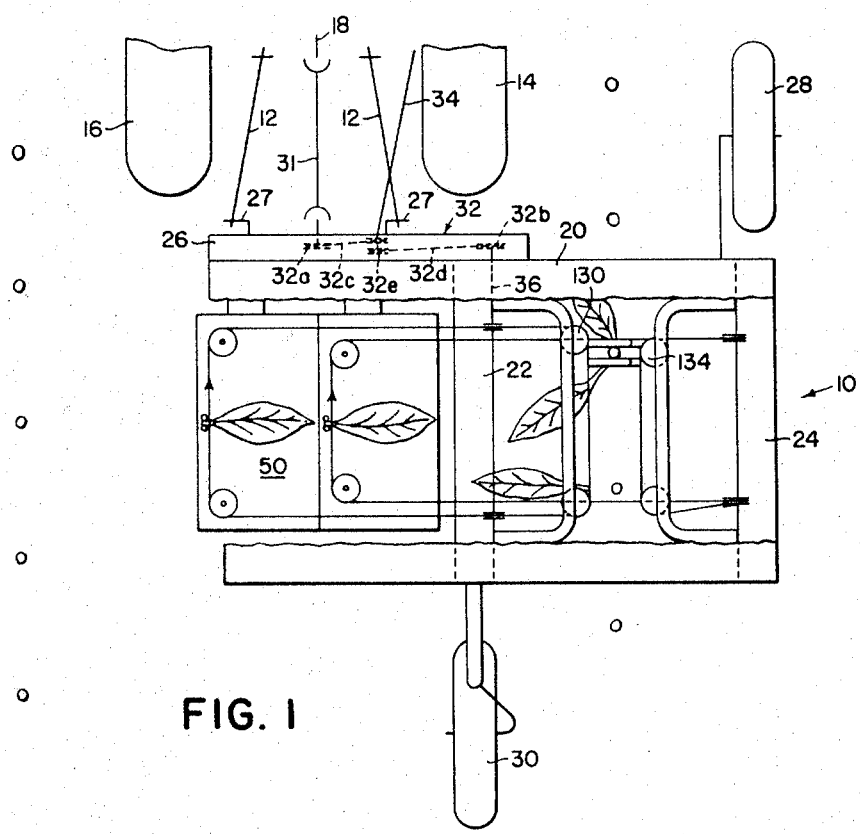
FIG. 1 is a plan view of a tobacco harvester in which the principles of this invention have been incorporated, the harvester being shown connected to the rear end of a conventional farm tractor, and portions of the top of the harvester being broken away for purposes of clarity.
Figure 2:
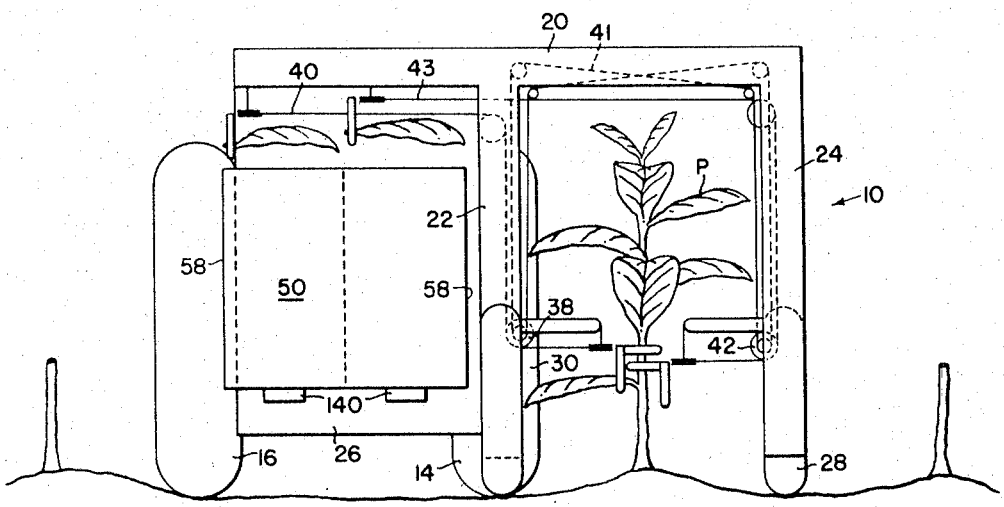
FIG. 2 is a rear view of the harvester shown in FIG. 1.

Referring first to FIGS. 1 and 2, a tobacco harvester indicated generally at 10 is secured to the lower draft links 12 of a tractor having right and left rear wheels 14 and 16 and a ground-driven power take-off shaft 18. The tobacco harvester has a transversely extending upper frame 20 which is supported by intermediate and right-hand downwardly extending frame sections 22, 24. The forward left-hand portion of the transversely extending upper frame 20 carries a depending frame structure 26 which is secured at its lower forward end to the lower draft links 12 of the tractor by conventional means 27. A ground-engaging wheel 28 is secured to the forward portion of the right frame 24, and a rear wheel 30 is secured to the rear portion of the frame 22. The wheels 28, 30 are mounted for vertical adjustment and by raising and lowering the wheels 28, 30 and the rear end of the lower draft links 12, the relative vertical position of the harvester can then be varied. While the mechanism for raising and lowering the wheels 28, 30 is not shown in the drawings, it is to be noted that this could be the form shown in co-pending application Ser. No. 481,229, now U.S. Patent 3,417,556.

Two pairs of orienting, defoliating, and conveying chain assemblies are provided, one assembly working from the right of the plant P, and the other assembly working from the left side of the plant. Each assembly consists essentially of a universal chain (i.e., a chain which is designed for multi-plane operation) which in turn carries a plurality of leaf-engaging means which are adapted to engage the tobacco leaves and perform desired functions at selected points of travel. Each chain has a fore-and-aft extending run adjacent the plant passage which carries the leaf-engaging means from front to rear in the passage. The chains are driven from the ground-driven tractor power take-off shaft 18 through a drive shaft 31 which is interconnected with a drive sheave 32a of a variable speed drive indicated generally at 32 which can be adjusted by the tractor driver by means of the lever 34. The variable speed drive includes an output sheave 32b, first and second drive belts 32c and 32d, and a pair of coupled variable diameter sheaves 32e. The output shaft 36 of the variable speed drive 32 is interconnected with a drive sprocket 38 which engages the left-hand chain 40. The variable speed drive is employed to align the leaf-engaging means with the tobacco plants at the beginning of a row. Once this adjustment has been achieved, the drive is placed in its direct drive position so that the leaf-engaging means will then move at ground speed. The engaging means will be arranged so that they are spaced apart by an amount equal to the spacing of the plants. This is possible since tobacco transplanters give rather precise even spacings between the stalks permitting matching of the leaf-engaging means with individual stalks. However, should adjustment be needed during the progress down the row it can be achieved by use of the adjustable drive mechanism.

The drive for the right-hand assembly, the left-hand drive having previously been explained, is through an overhead chain drive assembly 41, such as that used in copending application 481,229, the cross chain 41 driving a sprocket 42 which causes the left-hand chain 43 to be moved.

The structure of the leaf-engaging means and universal chain is best illustrated in FIGS. 3 and 4 and it can be seen that each leaf-engaging means comprises a pair of fingers 100 pivotally interconnected by a pin 102 which passes through the bifurcated ends 104 of each finger. Disposed about the pin 102 and within the bifurcated portion is a spring 106 which bears against tabs 108 and normally biases the fingers together. The bifurcated ends 104 each carry a pin 110 which in turn carries a cam roller 112 that is adapted to contact a cam track 114. The pin 102 is formed with a lower portion 116 extending at right angles to the upper portion, the lower portion being journaled within sleeve 118 which is formed at one side of plate 120 secured to the universal chain. The universal chain is formed from a plurality of links 121 which are interconnected to swing about oppositely disposed transverse pins 122. A spring 124 is disposed about the lower portion 116 and bears against a surface of the chain and a bifurcated portion 104 to bias the fingers in a clockwise manner when viewed as in FIG. 4.

Figure 6:
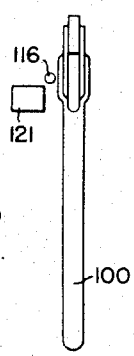
FIGS. 6–13 are details of the defoliators in various stations.
Figure 7:
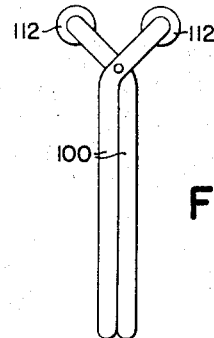

Thus, it can be seen that the distance between the cam track 114 and pin 102 is the determining factor relative to whether the fingers 100 are open or closed. If the pins are considerably spaced from the track 114, as shown in FIG. 3, the spring 106 forces the fingers closed. If the track 114 is close to the pins 102, the fingers are forced open. Even further, however, the track 114 determines the angular position of the finger device in respect to the axis of the pin portion 116. This can best be seen from viewing FIGS. 8, 10 and 12 which show the effect various relative positions between the pin portion 116 and track 114 has on the position of the fingers 100. The position of the fingers under the circumstances when no track is alongside the chain is shown in FIGS. 6 and 7. Under the latter circumstance, the spring 116 forces the fingers closed and the spring 124 forces the fingers into a position parallel to the links 121.

Therefore, it becomes clearly apparent that the angular position of the fingers 100 on pin 116 as well as whether the fingers are opened or closed is dependent upon the relation of the track to the finger device and conversely the operation of the fingers may be completely controlled by positioning the track at various positions.

Figure 8:
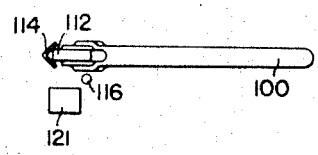
Figure 9:
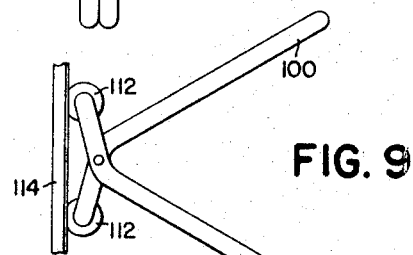
Figure 10:
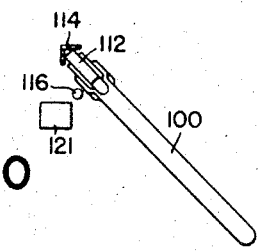
Figure 11:
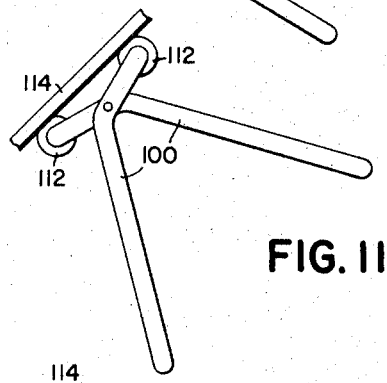
Figure 12:
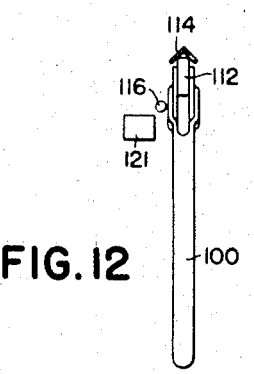
Figure 13:
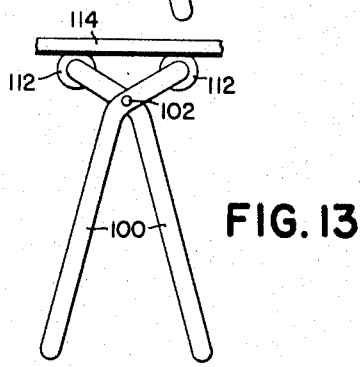

The operation of this invention can best be understood from FIG. 5 in which the left orienting, defoliating, and conveying assembly is schematically illustrated, and also from FIGS. 6-13 which show the position of the orienting fingers at various stations of their orbital movement. At station A (FIG. 5) the defoliating fingers are held closed and hang down due to the action of the springs 106, 124, respectively, this position also being illustrated in FIGS. 6 and 7. As the fingers move toward station B the rollers 112 engage the cam track 114 and the fingers are forced about the pin 116 upwardly to a horizontal open position as can be seen in FIGS. 8 and 9, and as the fingers pass the guide roller 130 they are positioned about the stalk of a tobacco plant, one finger being disposed forwardly of the stalk and the other to the rear of the stalk. As the fingers move towards station C they are forced to swing downwardly by cam track 114 combining the leaves which they engage toward the left-hand side of the stalk. FIGS. 10 and 11 illustrate the position of the fingers when they have moved roughly 45° toward the fully down position, the fingers in this position combing the leaves and thereby orienting them. When the fingers reach the full down position, such as shown in FIGS. 12 and 13, they are still initially open but before the fingers reach guide roller 132 the cam track 114 is positioned further away from the pin 102 thereby permitting the spring 106 to close the fingers. The conveyor chain turns and moves away from the tobacco stalks at guide roller 132 and the leaves are pulled or separated from the individual stalks and held by the fingers. The leaves are then conveyed by the fingers upwardly along the reach 48 and then outwardly until they are over the hopper 50 where the cam track 114 forces the fingers to be opened.

The operation of the right-hand conveying system is substantially the same except that the fingers do not swing into engagement with the stalks until after the left-hand fingers have swung, this being accomplished by positioning the left-hand guide roller 130 forwardly of the forward right-hand guide roller 134.

The tobacco harvester 10 is provided with a fork lift 140 which supports the leaf-receiving hopper 50 and which can lower the hopper for discharge. The sides of the hopper can be provided with extensible and retractable sides 58 which can be moved upwardly and downwardly in response to raising, and lowering of the fork lift 140. Thus, as the hopper starts to fill up, the fork lift can be moved down lowering the bottom while the sides remain up to increase the capacity while keeping the leaves from dropping too far.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An apparatus for priming leaves from a growing plant comprising: a mobile frame structure having a fore-and-aft extending passage movable alongside the plant, an endless universal chain mounted on said frame structure and having a fore-and-aft extending run alongside the passage, at least one pair of opposed finger means pivotally carried by the chain for swinging of the opposite finger means toward and away from one another about an axis normal to the chain and for swinging movement of each pair of finger means about an axis parallel to the chain, track means on the frame structure adjacent to the fore-and-aft run of the chain, means interconnecting the finger means and track means while the finger means are moving in said fore-and-aft run, the track means being positioned relative to the chain in said fore-and-aft run to initially cause the finger means to swing downwardly about the pivot parallel to the chain to orient certain leaves on a plant and subsequently swing toward one another to grasp said leaves.

2. The invention defined in claim 1 wherein each finger means has an end portion adjacent the chain, and the means interconnecting the finger means and the track means include roller means mounted on said end portions of the finger means and engageable with the track means.

References Cited

UNITED STATES PATENTS

| 2,696,069 | 12/1954 | Hawkins | 56—27.5 |
| 2,876,610 | 3/1959 | West et al. | 56—27.5 |
| 3,083,517 | 4/1963 | Wilson | 56—27.5 |